(12) United States Patent
Jaehnke et al.

(10) Patent No.: US 12,428,894 B2
(45) Date of Patent: Sep. 30, 2025

(54) DRIVE DEVICE FOR MOVING A LEAF

(71) Applicant: dormakaba Deutschland GmbH, Ennepteal (DE)

(72) Inventors: Jan-Hendrik Jaehnke, Ennepetal (DE); Thomas Balk, Ennepetal (DE); Sven Busch, Ennepetal (DE); Martin Wagner, Ennepetal (DE); Jan Eric Vom Brocke, Ennepetal (DE)

(73) Assignee: DORMAKABA DEUTSCHLAND GMBH, Ennepetal (DE)

( * ) Notice: Subject to any disclaimer, the term of this patent is extended or adjusted under 35 U.S.C. 154(b) by 262 days.

(21) Appl. No.: 18/028,123

(22) PCT Filed: Sep. 24, 2021

(86) PCT No.: PCT/EP2021/076322
§ 371 (c)(1),
(2) Date: Mar. 23, 2023

(87) PCT Pub. No.: WO2022/063964
PCT Pub. Date: Mar. 31, 2022

(65) Prior Publication Data
US 2023/0407694 A1    Dec. 21, 2023

(30) Foreign Application Priority Data

Sep. 25, 2020  (DE) .......................... 102020125102.5

(51) Int. Cl.
*E05F 15/63*    (2015.01)
*E05F 1/10*    (2006.01)
*H02K 7/116*    (2006.01)

(52) U.S. Cl.
CPC .............. *E05F 15/63* (2015.01); *E05F 1/105* (2013.01); *H02K 7/116* (2013.01); *E05F 2015/631* (2015.01); *E05Y 2201/442* (2013.01); *E05Y 2201/604* (2013.01); *E05Y 2201/72* (2013.01);
(Continued)

(58) Field of Classification Search
None
See application file for complete search history.

(56) References Cited

U.S. PATENT DOCUMENTS

| 4,727,679 | A | 3/1988 | Kornbrekke et al. |
| 2009/0206777 | A1 | 8/2009 | Taheri et al. |
| 2019/0319557 | A1* | 10/2019 | Dye ..................... E05F 15/619 |

FOREIGN PATENT DOCUMENTS

| DE | 102015112685 B3 | 11/2016 |
| WO | 2013169888 A1 | 11/2013 |

OTHER PUBLICATIONS

Translated International Search Report for International Search Report PCT/EP2021/076322, International Filing Date Sep. 24, 2021, Date of Mailing Jan. 5, 2022, 2 pages.

* cited by examiner

*Primary Examiner* — Bernard Rojas
(74) *Attorney, Agent, or Firm* — CANTOR COLBURN LLP (57) ABSTRACT

A drive device for moving a leaf, in particular a door leaf or a window leaf, with an electric machine including an, in particular single, stator and an, in particular single, rotor, which can be rotated about a machine axis, and with a gear coupled to the electric machine. The gear has a first gear element, which can be rotated coaxially with the machine axis, with the first gear element being connected to the rotor in a rotationally-fixed manner.

12 Claims, 6 Drawing Sheets

(52) U.S. Cl.
CPC ..... *E05Y 2800/232* (2013.01); *E05Y 2800/26* (2013.01)

DRIVE DEVICE FOR MOVING A LEAF

CROSS-REFERENCE TO RELATED APPLICATIONS

This application is a 35 U.S.C. § 371 National Stage patent application of PCT/EP2021/076322 filed 24 Sep. 2021, which claims the benefit of German patent application 102020125102.5 filed 25 Sep. 2020, the disclosures of which are incorporated herein by reference in their entirety.

TECHNICAL FIELD

The disclosure relates to a drive device for moving a leaf having the features of the preamble of claim 1.

BACKGROUND

Drive devices can be used to move a leaf, with a leaf being understood in particular to mean a door or window leaf. The movable part of a door is referred to as a door leaf, for which the term door panel is also common.

Such drive devices for moving a leaf are known. Such drive devices comprise a drive unit and a toothed gear coupled to the drive unit. The drive unit is coupled to a door closer via the toothed gear such that a leaf of a door can be closed by the door closer and, if necessary, opened by the electric motor, for example in the event of a fire to extract smoke and heat. The toothed gear is provided in an exposed manner on an outer surface of the drive unit and therefore occupies an additional installation space.

Drive devices mentioned in the introduction are typically provided directly on the leaf to be moved or on a door frame or a window frame. The installation space available is very limited, in particular when assembling on the door frame or the window frame.

Against this background, the disclosure enables a compact configuration of the drive device.

SUMMARY

This is achieved by providing a drive device for moving a leaf, in particular a door leaf or a window leaf, having the features of claim 1. Advantageous further developments of the drive device are indicated in the dependent claims, the description and in the figures. Features and details that are described in connection with the drive device according to the disclosure also apply in connection with the method according to the disclosure and/or with the use according to the disclosure and vice versa. In this case, the features mentioned in the description and in the claims may each be essential to the disclosure individually by themselves or in combination. The description additionally characterizes and specifies the disclosure, in particular in connection with the figures.

A drive device for moving a leaf, in particular a door leaf or a window leaf, is particularly advantageously indicated. The drive device has an electric machine comprising an, in particular single, stator and an, in particular single, rotor, which can be rotated about a machine axis, and a gear coupled to the electric machine. The gear has a first gear element, which can be rotated coaxially with the machine axis. In particular, the first gear element can be connected to the rotor in a rotationally-fixed manner.

This configuration is advantageous in terms of saving installation space in the radial direction of the electric machine.

The term axes, in particular as in the case of leaf axis, output axis, machine axis, axis of rotation, means virtual axes which are fundamentally not limited in their extent.

It may be preferred that the gear has a second gear element, which is operatively connected to the first gear element and that an axis of rotation of the second gear element runs in an installation space between the machine axis and an outer lateral surface of the rotor that is extended virtually in the axial direction of the machine or an outer lateral surface of the stator that is extended virtually in the axial direction of the machine, in particular parallel to the machine axis.

This configuration is advantageous in terms of a further saving in installation space in the radial direction of the electric machine.

In particular, each axis of rotation of each gear element can run parallel to the machine axis.

In particular, the first gear element can be arranged entirely in an installation space, with the installation space being delimited by an outer lateral surface of the rotor that is extended virtually in the axial direction of the machine.

It may be preferred that the first gear element and the second gear element or the entire gear can be arranged entirely in one installation space, with the installation space being delimited by an outer lateral surface of the rotor that is extended virtually in the axial direction of the machine or by an outer lateral surface of the stator that is extended virtually in the axial direction of the machine.

It may be preferred that the drive device has a machine housing and/or a gear housing and/or a motor-gear housing. It may also be preferred that the machine is arranged at least partially within the machine housing. It may be particularly preferred that the gear is at least partially arranged within the motor-gear housing.

The wording—within the housing—means that the elements are arranged at least partially, in particular completely, in the space formed by the housing.

Alternatively or cumulatively, the machine and/or the gear can be arranged at least partially, in particular completely, within the motor-gear housing.

This configuration is advantageous with regard to the modularity of the drive device, i.e. the modules and/or elements that can be separated from one another.

In particular, the machine housing and/or the gear housing can be formed by the motor-gear housing.

In particular, the machine housing and/or the gear housing can have prefabricated mounting points for a form-fitting and/or force-fitting and/or materially-bonded connection to one another. Furthermore, the machine housing and/or the gear housing can be designed in one piece.

In particular, the machine housing and/or the motor-gear housing and/or a closer housing can each have one or a plurality of prefabricated mounting points for the form-fitting and/or force-fitting and/or materially-bonded connection with the electric machine and/or the gear. In particular, one or a plurality of such connections can be designed in the form of at least one screw connection and/or one pin connection and/or one press fit and/or one T-groove and/or one snap connection.

This configuration is advantageous with regard to a simple and easy-to-assemble design.

It may be preferred that the gear is designed as a toothed gear, in particular as a spur gear and/or a planetary gear or as an eccentric gear.

As a planetary gear, the gear can have a sun gear that is rotationally-fixed with the rotor, in particular in one piece therewith, a plurality of planetary gears fastened about the sun gear on a planetary carrier, and a ring gear that is engaged with the planets. In this case, the ring gear can be rotatably mounted and form the power output of the planetary gear, with the planetary carrier being designed to be stationary. Alternatively, the planetary carrier can be rotatably mounted and form the power output of the planetary gear, with the ring gear being designed to be stationary. The terms planet and planetary wheel are used synonymously.

In particular, the gear can be designed as a combination of planetary gear and spur gear. The ring gear of the planetary gear can have external teeth and act as a spur gear, in particular with the ring gear being engaged with a closer wheel of a closer module and/or an interface element and/or with the ring gear forming the interface element.

As an eccentric gear, the gear can be designed as a planetary eccentric gear and/or strain wave gear.

It may also be preferred that the gear is designed as a planetary gear, with the first gear element being designed as a sun gear and at least one second gear element as a planetary gear. It may be preferred that the gear has at least one Wolfrom stage.

As a planetary gear, the gear can also have at least one Wolfrom stage. In a preferred embodiment of such a Wolfrom stage, the planetary gear has a first gear stage and a second gear stage, with the first gear stage comprising the sun gear, a plurality of first planets fastened to a planetary carrier and driven by the sun gear, and a first stationary ring gear. The second gear stage comprises a second rotatable ring gear and second planets, which are rotationally-fixed with the first planets, in particular in one piece therewith. The second planets drive the second ring gear. In particular, the second ring gear can form the power output of the planetary gear.

It may be preferred that the gear comprises the first ring gear, which is engaged with the planetary gear, with the planetary gear being mounted so as to be rotatable on a planetary carrier, with the planetary carrier being mounted so as to be rotatable on the sun gear or on the rotor, which is connected to the sun gear in a rotationally-fixed manner.

In particular, the first ring gear can have a first number of teeth and the gear can have a second ring gear with a second number of teeth, with the difference between the first and the second number being a value that is less than 5, preferably less than 2, particularly preferably 1.

It may be preferred that the drive device has an output shaft, which can be rotated about an output axis, for, in particular rotationally-fixed, connection to a lever, with the output axis running parallel or coaxially to the machine axis.

The lever serves to form the connection of the drive device to the leaf or to a frame, and the drive device can be mounted either on the frame or on the leaf. Within the meaning of the disclosure, the term frame also includes a door frame or window frame. The lever can in particular be designed in such manner that a voltage supply of the electric machine and/or at least one control signal for the electric machine can be transmitted via the lever to a motor-gear module, in particular to the electric machine.

It may be preferred that the drive device has a closer module with a mechanical energy storage device.

In particular, the mechanical energy storage device can have one or a plurality of compression springs and/or tension springs, which are connected to a linkage carriage. The linkage carriage is used to form an operative connection between a transmission element and the mechanical energy storage device of the closer module.

Therefore, even in an emergency, for example in the event of a fire, safe, purely mechanical, i.e. de-energized closing by the closer module can be made possible.

It may be preferred that the drive device comprises the closer module with the mechanical energy storage device and the transmission element for translating a linear movement of the energy storage device into a rotational movement of the transmission element. In particular, the transmission element can be designed as a cam disc.

Depending on the requirements, the cam disc can be designed symmetrically or asymmetrically. Furthermore, the cam disc can be designed as a stroke-producing cam disc, in particular heart-shaped.

In particular, the closer module can be arranged at least partially, in particular completely, in an installation space between the electric machine and a main closing edge of the leaf.

It may be preferred that the closer module comprises a closer wheel, in particular closer gear wheel, which is operatively connected to the energy storage device, in particular by means of the transmission element. It may be preferred that the closer wheel is arranged coaxially, in particular in a rotationally-fixed manner, with respect to the transmission element. Preferably, the transmission element and the closer wheel can be connected in a form-fitting and/or force-fitting and/or materially-bonded manner, particularly preferably designed in one piece.

In particular, the output axis and an axis of rotation of the transmission element and/or the axis of rotation of the closer wheel can run spaced apart from one another, in particular parallel to one another.

On the one hand, as a result, the output shaft and the transmission element do not rotate about the same axis of rotation and can be arranged in different positions, in particular in a modular manner. On the other hand, the parallel profile reduces energy losses and facilitates assembly.

The closer wheel and the transmission element can be mounted so as to each be rotatable individually or rotatable together about a common axis of rotation. Furthermore, the closer wheel and the transmission element can each individually or together be mounted so as to be rotatable on a fixed axle body by means of one or a plurality of pivot bearings, in particular roller bearings or slide bearings, in particular needle bearings or ball bearings. The axle body is not rotatable.

In particular, the transmission element and the closer wheel can be connected to one another in a form-fitting and/or force-fitting and/or materially-bonded manner and in a rotationally-fixed manner or can be formed in one piece.

This configuration is advantageous in terms of saving installation space in the axial extension, in that the bearings can be arranged surrounded by the transmission element and/or by the closer wheel.

In particular, the transmission element and/or the closer wheel can each individually or together be mounted so as to be rotatable on the axle body by means of at least one pivot bearing, preferably a roller bearing or a slide bearing, in particular a needle bearing or a ball bearing.

In particular, the closer module can have a closer housing. In particular, the axle body can be fixed on the closer housing.

It may be preferred that the gear has a transmission ratio as a quotient of the speed of the rotor as a dividend and the speed of the closer wheel or the speed of the transmission element of less than 125, preferably less than 100, particularly preferably less than 75.

It may be preferred that the drive device comprises at least one interface element for forming an operative connection between the electrical machine and the closer module. In particular, the interface element can comprise at least one gear wheel.

Torque can be transmitted from the rotor to the closer module and/or from the closer module to the rotor by means of the interface element. The interface element can be formed by means of at least one gear element of the gear, in particular a ring gear, and/or by means of at least one element of the closer module, in particular by means of the closer wheel and/or by an additional element. The interface element can be designed in one piece or in several pieces. The interface element is operatively connected, in particular engaged, with the gear and operatively connected to the energy storage device.

In particular, a torque can be transmitted from the output shaft to the closer module and/or from the closer module to the output shaft by means of the interface element. The interface element can be formed by means of at least one gear element of the gear and/or by means of at least one element of the closer module and/or by an additional element. The interface element can be designed in one piece or in several pieces.

In particular, the motor-gear housing can comprise a first opening and the closer housing can comprise a second opening. The motor-gear housing and the closer housing can be arranged relative to one another in such manner that the closer module, in particular the energy storage device, and the gear, in particular an output shaft, are in operative connection with one another through the first and the second opening by means of the interface element.

In particular, the walls of the respective housing, which comprise the first and second openings, can be designed in such manner that the motor-gear housing and the closer housing can be mounted flush with one another.

In particular, the interface element can protrude into the motor-gear housing and/or into the closer housing. In particular, the interface element can protrude into the space formed by the respective housing.

In particular, the motor-gear housing can be connected to the closer housing in a form-fitting and/or force-fitting and/or materially-bonded manner. Such a connection can be effected, for example, in particular by means of at least one screw connection and/or one pin connection and/or one press fit and/or T-groove and/or one snap connection.

It may be preferred that the drive device has the motor-gear housing and the closer housing, with the machine and the gear being arranged at least partially within the motor-gear housing, with the energy storage device being arranged within the closer housing, with the electric machine and the energy storage device being in operative connection by means of the interface element. It may be preferred that the interface element protrudes through a first opening of the motor-gear housing into the motor-gear housing and/or through a second opening of the closer housing into the closer housing.

It may be preferred that the electric machine is designed as an axial flux machine.

This configuration is advantageous in terms of a compact design combined with high performance. This configuration is advantageous in terms of saving installation space.

It may also be preferred that the stator has an, in particular plate-shaped, stator base and a plurality of stator teeth protruding from the stator base, in particular in the axial direction. It may be particularly preferred that a coil is wound at least indirectly or directly around one, in particular around each, stator tooth.

The electric machine, including the axial flux machine, can be designed as a motor and/or generator. As a motor, the axial flux machine can generate a rotational movement, in particular a torque, from electrical energy. As a generator, the axial flux machine can generate electrical energy from a rotational movement, in particular from a torque.

In the axial flux machine, the magnetic flux is mainly formed parallel to the machine axis of the electric machine. The axial flux machine has a small overall axial length compared to other machine types. The axial overall length means an overall length in a direction parallel to the machine axis. The use of an axial flux machine therefore enables the dimensions of the electric machine to be reduced in the axial direction. This allows a compact configuration of the motor-gear module. In particular, the axial flux machine can be a brushless direct current machine, in particular a so-called BLDC machine. Such a machine is designed like a three-phase synchronous machine with excitation by permanent magnets.

The machine axis means the axis of rotation about which a rotor of the electric machine rotates.

In particular, the electric machine, in particular as a motor, can have a ratio of the maximum torque to the axial extent of the machine that is greater than 30 Nm/m, preferably greater than 100 Nm/m, particularly preferably greater than 200 Nm/m. The axial extension means the extension of the machine parallel to the machine axis. In particular, this ratio can be greater than Nm/m, preferably greater than 70 Nm/m, particularly preferably greater than 150 Nm/m. In particular, the electric machine can have a torque density, i.e. torque to motor volume, of greater than or equal to 6000 Nm/m^3, preferably greater than or equal to 15000 Nm/m^3 and particularly preferably greater than or equal to 20000 Nm/m^3 and/or a torque constant of greater than or equal to Nm/A, preferably greater than or equal to 0.2 Nm/A and particularly preferably greater than or equal to 0.3 Nm/A. These configurations of the electric machine enable a compact design of the gear and such small transmission ratios, while still enabling reliable, in particular assisted, opening and/or reliable closing of the leaf. The drive device is compact overall.

In particular, the electric machine configured as an axial flux machine can have a ratio between the extent of at least one stator tooth in the axial direction of the electric machine as a dividend and the extent of the stator base in the axial direction of the electric machine, with the ratio being greater than or equal to 2, in particular greater than or equal to 3, in particular greater than or equal to 4, in particular greater than or equal to 5, in particular greater than or equal to 6.

The term coil means an electrical conductor with at least one winding. The electrical conductor can be designed as a wire and/or strip, in particular insulated by means of a coating, preferably by means of an insulating varnish. For this purpose, the conductor can have an insulating coating, in particular an insulating varnish. In particular, the coil can be designed as a cast coil, with individual windings of the coil being electrically insulated from one another by means of a cast material.

In particular, the stator can have one or a plurality of coils, preferably 7 to 16, particularly preferably 10 to 14 coils, with the coil or coils of the stator being arranged in such manner that a magnetic flux can be generated through the coil or coils in a direction parallel to the machine axis.

In particular, a circuit board can be arranged in an installation space between the stator base and the rotor. In particular, at least one, in particular each, of the coils can be electrically connected to the circuit board. In particular, the coil can be soldered to the circuit board. In particular, at least one, in particular each, coil, can be integrated in or on the circuit board, in particular arranged in the material of the circuit board.

Within the meaning of the disclosure, a circuit board is a plate-shaped, in particular fitted, element for conducting electrical energy. The circuit board can be designed as a printed circuit board. The terms are used synonymously below. The circuit board can comprise a plurality of layers and/or have plastic and/or be designed to be flexible. In particular, the circuit board can be designed as a solid aluminum printed circuit board. This configuration is advantageous in terms of good heat conduction properties.

In particular, the printed circuit board can extend at least partially over an installation space that is delimited by a lateral surface of the stator that is extended in the axial direction of the electric machine and/or by a lateral surface of the rotor that is extended in the axial direction of the electric machine.

In particular, the circuit board can be arranged parallel to the stator base.

In particular, the stator can have the, in particular plate-shaped, stator base and a plurality of stator teeth protruding from the stator base in the axial direction of the machine, with the circuit board being arranged in a first plane, in particular parallel to the stator base, with the first plane lying in an intermediate space between the stator teeth and the rotor. In particular, the circuit board can rest on the stator teeth.

In particular, the circuit board can be arranged in an air gap between the stator and the rotor.

In particular, the stator can have a plurality of stator teeth protruding from the stator base in the axial direction of the electric machine, with the circuit board being arranged in a second plane, in particular parallel to the stator base, with the second plane being interrupted by at least one, in particular each stator tooth, of the stator.

This configuration is advantageous in terms of further savings of installation space in the axial direction.

In particular, the stator teeth can protrude from a common surface of the stator base. In particular, the stator base can be connected to at least one, in particular each, stator tooth in a form-fitting and/or force-fitting and/or materially-bonded manner or can be formed in one piece therewith.

In particular, the circuit board can have one or a plurality of breakthroughs, in particular the number of breakthroughs corresponding to the number of stator teeth, through which breakthroughs the stator teeth pass.

The shape of the respective breakthroughs can correspond to the surface of the respective teeth parallel to the circuit board. In particular, the circuit board can comprise a single breakthrough fora plurality of or all the teeth. In particular, the rotor can comprise at least one permanent magnet, with the permanent magnet being arranged along a virtual circle around the machine axis and spanning a first angular range. In particular, the stator can comprise the stator base with at least one stator tooth protruding from the stator base, in particular in the axial direction of the axial flux machine, with the stator tooth being arranged along a virtual circle around the machine axis and spanning a second angular range, with the ratio of the first angular range as dividend to the second angular range being in the range from 1.1 to 1.6, preferably in the range from 1.2 to 1.5, particularly preferably in the range from 1.3 to 1.4. If there are a plurality of teeth and/or magnets, each tooth can have the above-mentioned ratio to each magnet. Alternatively or cumulatively, in the case of a plurality of magnets and teeth, a summed range, i.e. a ratio, can be in a range from 1.3 to 1.9 or even from 1.5 to 1.8.

The term circle around machine axis means that the machine axis forms the center of the circle.

A surface of the stator tooth, in particular of each stator tooth, running parallel to the stator base can thereby be designed in such manner that the surface widens in the radial direction of the stator, starting from the machine axis. Alternatively or cumulatively, a surface of the permanent magnet, in particular of each permanent magnet, running parallel to the stator base can be designed in such manner that the surface widens in the radial direction of the rotor, starting from the machine axis. In this way, the specified ratio of the first angular range as a dividend to the second angular range can be kept constant along the radial profile of the stator. In particular, the surface of the stator tooth, in particular of each stator tooth, running parallel to the stator base can remain constant along the axial profile of the stator tooth.

In particular, at least one, in particular each, permanent magnet can be designed in the form of a plate. In particular, the rotor can have a rotor plate, in particular a rotor disc. Furthermore, at least one, in particular each, permanent magnet can protrude from the rotor plate of the rotor in the axial direction of the machine, in particular in the direction of the stator. In particular, the rotor plate can have one or a plurality of indentations, in particular a number of indentations corresponding to the number of permanent magnets, with a permanent magnet lying in each indentation. In particular, the shape of the indentation, in particular of each indentation, can correspond to the shape of the inlaid permanent magnet. This serves to secure the permanent magnets on the rotor, in particular on the rotor plate.

In particular, the ratio between the number of permanent magnets as a dividend and the number of windings can be in a range from 1.0 to 1.6, preferably in a range from 1.2 to 1.4, particularly preferably can be 4:3, in particular 1.1; in particular 7:6.

In particular, the stator base can have a bearing mount for receiving a roller bearing or a slide bearing. In particular, the bearing mount can be arranged on a stationary bolt which is connected to the stator in a form-fitting and/or force-fitting and/or materially-bonded manner or is formed in one piece therewith.

This configuration is advantageous in terms of a compact design in the axial direction.

In particular, the bearing mount can have an, in particular annular, bearing support surface, which is connected to the stator base in a form-fitting and/or force-fitting and/or materially-bonded manner or is formed in one piece therewith.

The bearing support surface designates a surface on or against which the bearing can rest.

In particular, the bearing mount can be cylindrical, in particular hollow-cylindrical.

In particular, the stator can have a stationary bolt, with the bolt being connected to the stator in a form-fitting and/or force-fitting and/or materially-bonded manner or being formed in one piece therewith and comprising the bearing mount.

In particular, the drive device can have a motor-gear module that has an electric machine, with the electric machine having the, in particular single, stator and the, in particular single, rotor, which can be rotated about a machine axis. The drive device also has a gear, with the drive device having an output shaft which can be rotated about an output axis. In particular, the gear has a transmission ratio as a quotient of the speed of the rotor as a dividend and the speed of the output shaft, with the transmission ratio being less than 125, preferably less than 100, particularly preferably less than 75.

By selecting the transmission ratio of the gear, which is less than 125, preferably less than 100, particularly preferably less than 75, a compact design of the gear is made possible such that the drive device is compact overall, but with a reduction in friction also being achieved. The efficiency of the gear can also be increased as a result, since with small transmission ratios, energy losses can be reduced.

In particular, the motor-gear module can have a motor-gear housing. In particular, the electric machine can be arranged entirely within the motor-gear housing. In particular, the output shaft can be arranged at least partially, preferably completely, within the motor-gear housing.

In particular, the drive device can be used in a swing leaf door drive or in a sliding door drive or in a revolving door drive.

In a swing leaf drive, a leaf is pivoted from a closed position, in which the leaf rests against a frame, to an open position about a leaf axis by means of the drive device, with the torque being transferred by means of a lever from the output shaft of the drive device to the door or to the frame. The drive device can be mounted on the leaf, and a slide rail can be arranged on the frame, or can be mounted on the frame, and a slide rail can be arranged on the leaf. In addition to the drive device, the swing leaf drive can also comprise the lever and/or the slide rail and/or the leaf. In particular when used on fire protection leaves, the drive device can have a closer module. In the event of a fire, the closer module ensures that the fire protection leaf closes, in particular without manual actuation.

In a sliding door drive, a leaf is displaced in a translatory manner along a slide rail by means of the drive device, with it being possible for the leaf to be connected to a linkage carriage running in the slide rail. In addition to the drive device, the sliding door drive can have the leaf and/or the slide rail and/or the linkage carriage.

In a revolving door drive, two or more door leaves, which are attached to a vertical central axis and rotate in a round rotary housing, are rotated by means of the drive device. In addition to the drive device, the revolving door drive can have the rotary housing and/or the leaves.

The terms axis, leaf axis and output axis mean virtual axes, in particular also axes of rotation, which are fundamentally not limited in their extent. The machine axis means the axis of rotation around which the rotor of the electric machine rotates.

In particular, a control module can be arranged in or on the closer module.

In particular, the motor-gear module and/or the closer module and/or the control module can be arranged at least partially, in particular completely, within a superordinate casing, i.e. within a superordinate housing. The terms superordinate housing and superordinate casing are used synonymously below.

In particular, the control module can have a control housing. The control module can be arranged entirely within the control housing. In particular, the control housing can be connected to the superordinate housing and/or to the motor-gear housing and/or to the closer housing in a form-fitting and/or force-fitting and/or materially-bonded manner. In particular, one or a plurality of such connections can be designed in the form of at least one screw connection and/or one pin connection and/or one press fit and/or one T-groove and/or one snap connection.

In particular, the drive device, preferably the electric machine and/or the gear and/or the energy storage device, can be designed in such manner that the leaf can be moved without manual force exerted by a person, in particular without a manual torque exerted by a person, on the leaf, in particular in a fully automated manner, by means of the drive device, in particular by means of a machine torque. However, the movement of the leaf can be accelerated by the manual force exerted by the person, in particular the manual torque, on the leaf.

The movement of the leaf here means an opening movement and/or a closing movement of the leaf.

Alternatively, the drive device, preferably the electric machine and/or the gear and/or the energy storage device, can be designed as an auxiliary drive in such manner that the leaf is only moved if at least at one point in time of the movement of the leaf, in particular at a beginning of the movement, in addition to a force generated by the drive device, in particular a machine torque, a manual force exerted by a person, in particular a manual torque exerted by a person, is exerted on the leaf.

In particular, the motor-gear housing and the closer housing can each be cuboid. The motor-gear housing and/or the closer housing can be cuboid, i.e. with four adjacent walls, with the adjacent walls being orthogonal to one another in order to enable mounting on both sides. In this way, the drive device can be mounted on both sides.

BRIEF DESCRIPTION OF THE DRAWINGS

Further details and advantages of the disclosure will be explained below on the basis of the exemplary embodiments shown in the figures. They show.

DETAILED DESCRIPTION OF THE DRAWINGS

The same parts are always provided with the same reference numerals in the different figures, which is why they are generally also only described once.

Figure 1:
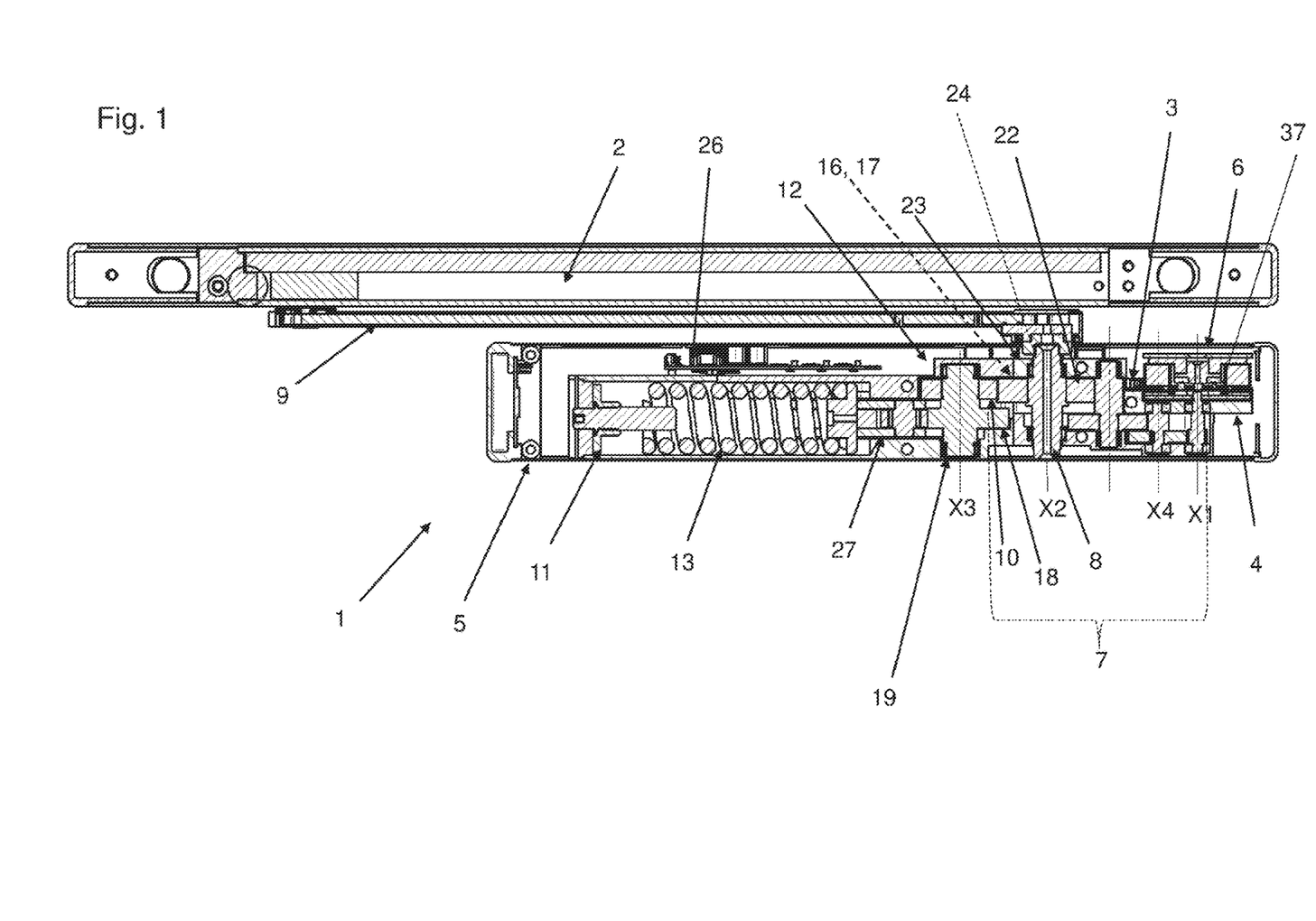
FIG. 1 an exemplary embodiment of a drive device according to the disclosure in a schematic sectional representation.

FIG. 1 shows a drive device 1 for moving a leaf, in particular a door leaf or a window leaf. The drive device 1 has a motor-gear module 3, which has a motor-gear housing 4, an electric machine 6 with a machine axis X1, a gear 7 with an output shaft 8, which is mounted so as to be rotatable about an output axis X2, for connection to a lever 9. The drive device 1 also has a closer module 11 which has a closer housing 12 and a mechanical energy storage device 13. The drive device 1 has an interface element for forming an operative connection between the motor-gear module 3 and the closer module 11.

The gear 7 has a transmission ratio as a quotient of the speed of the rotor as a dividend and the speed of the output shaft, with the transmission ratio being less than 125, preferably less than 100, particularly preferably less than 75.

The lever 9 is thereby used to form a connection between the drive device 1 and the leaf, i.e. with the exemplary door leaf or window leaf or with a frame, with the drive device 1 being able to be mounted either on the frame or on the leaf. Within the meaning of the disclosure, the term frame also includes a door frame or window frame. In particular, the lever 9 can be designed in such manner that a voltage supply of the electric machine 6 and/or at least one control signal for the electric machine 6 can be transmitted via the lever 9 to the motor-gear module 3, in particular to the electric machine 6 and/or to the control module 26. The lever 9 is guided in a slide rail 2, which would be mounted in the represented exemplary embodiment on a frame, not represented.

Figure 2:
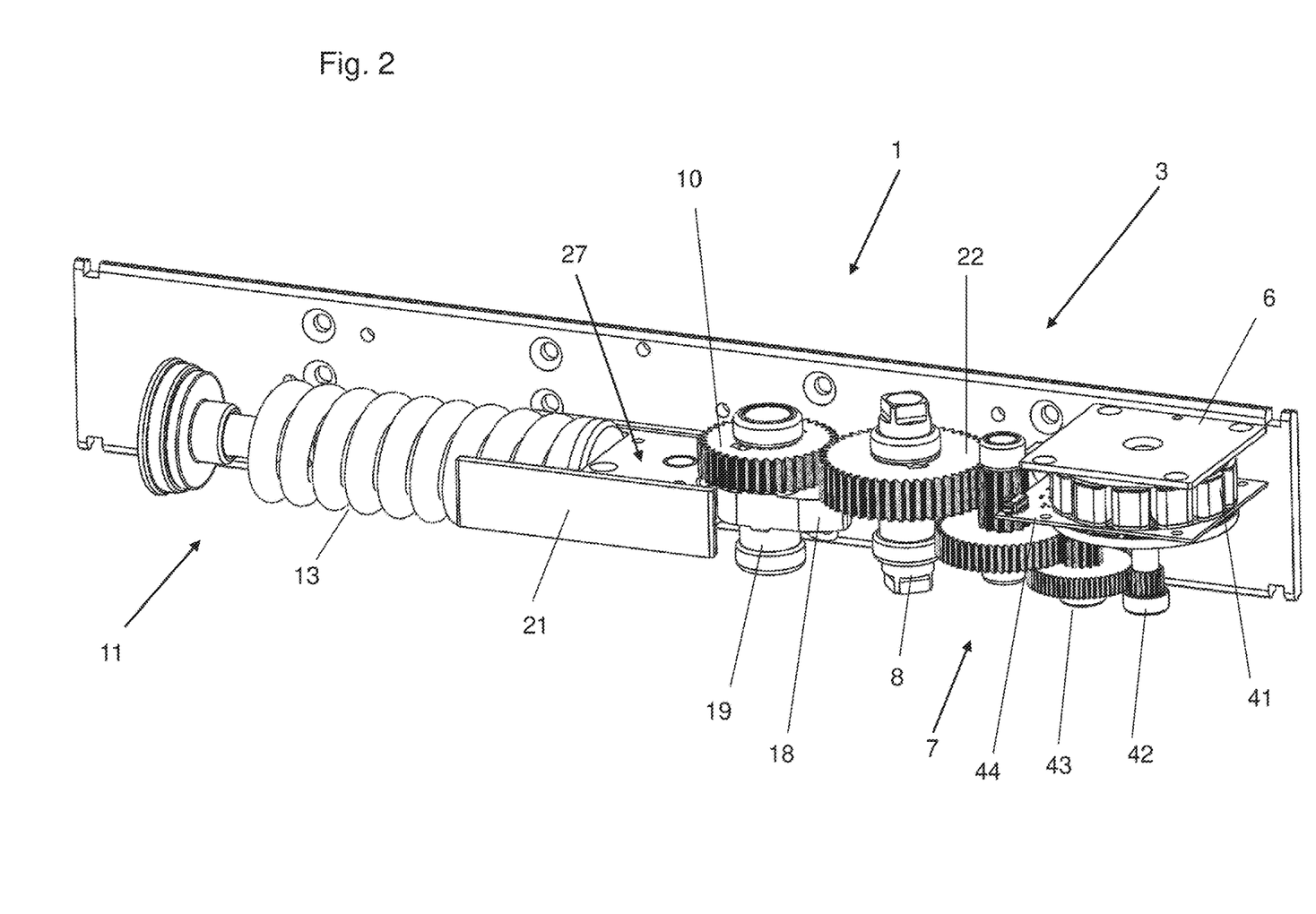
FIG. 2 the drive device from FIG. 1 as a detail in a perspective view.

As can be clearly seen in FIGS. 1 and 2, the output shaft 8 is arranged in an installation space between the machine axis X1 of the electric machine 6 and the energy storage device 13.

The motor-gear housing 4 has a first opening 16, with the closer housing 12 having a second opening 17. As can be seen in FIG. 1, the motor-gear housing 4 and the closer housing 12 are arranged in relation to one another in such manner that the closer module 11, in particular the energy storage device 13, and the gear 7, in particular the output shaft 8, are in operative connection with one another through the first opening 16 and the second opening 17 by means of the interface element.

The motor-gear module 3 and/or the closer module 11 is arranged at least partially, in particular completely, within a superordinate housing 5. The motor-gear housing 4 is connected to the superordinate housing 5 and/or to the closer housing 12 in a form-fitting and/or force-fitting and/or materially-bonded manner. The closer housing 12 is connected to the superordinate housing 5 in a form-fitting and/or force-fitting and/or materially-bonded manner. One or a plurality of such connections are designed, for example, in the form of at least one screw connection.

It can be seen in FIGS. 1 and 2 that the output axis X2 is parallel to the machine axis X1.

The closer module 11 has a transmission element 18 for translating a linear movement of the energy storage device 13 into a rotational movement of the transmission element 18 about an axis of rotation X3 of the transmission element 18. As can be seen by way of example in FIG. 1, the output axis X2 and the axis of rotation X3 of the transmission element 18 are spaced apart from one another and run parallel to one another. The transmission element 18 is designed as a cam disc, specifically as a heart-shaped stroke-producing cam disc, and is rotatably mounted in a rotationally-fixed manner with a closer wheel 10.

For example, the mechanical energy storage device 13 is designed as a compression spring. The compression spring is connected via a linkage carriage 27 to the transmission element 18 for translating the linear movement of the mechanical energy storage device 13 into a rotational movement of the transmission element 18. The linkage carriage 27 has sliding elements 21, which can be seen in FIG. 2. The linkage carriage 27 can be seen in FIG. 4.

The closer wheel 10 is arranged in a coaxial and rotationally-fixed manner in relation to the transmission element 18 for translating the linear movement of the energy storage device 13 into a rotational movement of the transmission element 18.

The gear 7 has an output wheel 22, in particular an output gear wheel, which is coaxial and rotationally-fixed with the output shaft 8, with the output wheel 22 being engaged with the closer wheel 10.

In the exemplary embodiment of FIGS. 1 and 2, the interface element is formed by the output wheel 22.

For example, the motor-gear housing 4 has a first wall 23 with an output opening 24 for the, in particular, rotationally-fixed connection of the output shaft 8 to the lever 9, a second wall adjoining the first wall 23 and a third wall opposite the second wall, with the drive device 1 being designed so as to be fastened both with the second wall and the third wall facing towards the leaf, i.e. the exemplary door leaf. The same can apply to the closer housing 12. The motor-gear housing 4, but also the closer housing 12, can each be cuboid in order to enable assembly on both sides.

The control module 26, which has a control device, can also be seen in FIG. 1. The control module 26 is arranged completely within the superordinate housing 5 of the drive device 1.

Figure 3:
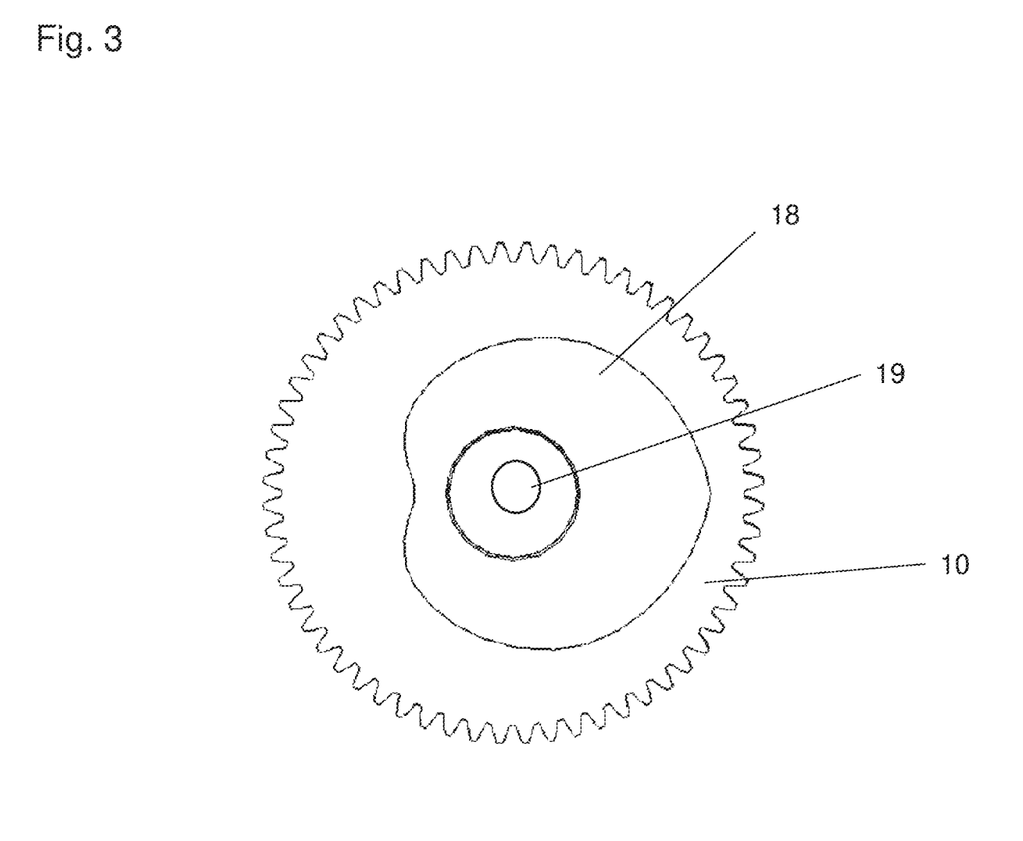
FIG. 3 a transmission element with a closer wheel in a top view.

FIG. 3 shows a special embodiment, with the transmission element 18 being formed as a cam disc, specifically as a heart-shaped stroke-producing cam disc. As can also be seen in FIG. 3, a fixed axle body 19 is arranged, with the transmission element 18 and the closer wheel 10 being rotatably mounted on the axle body 19.

Figure 4:
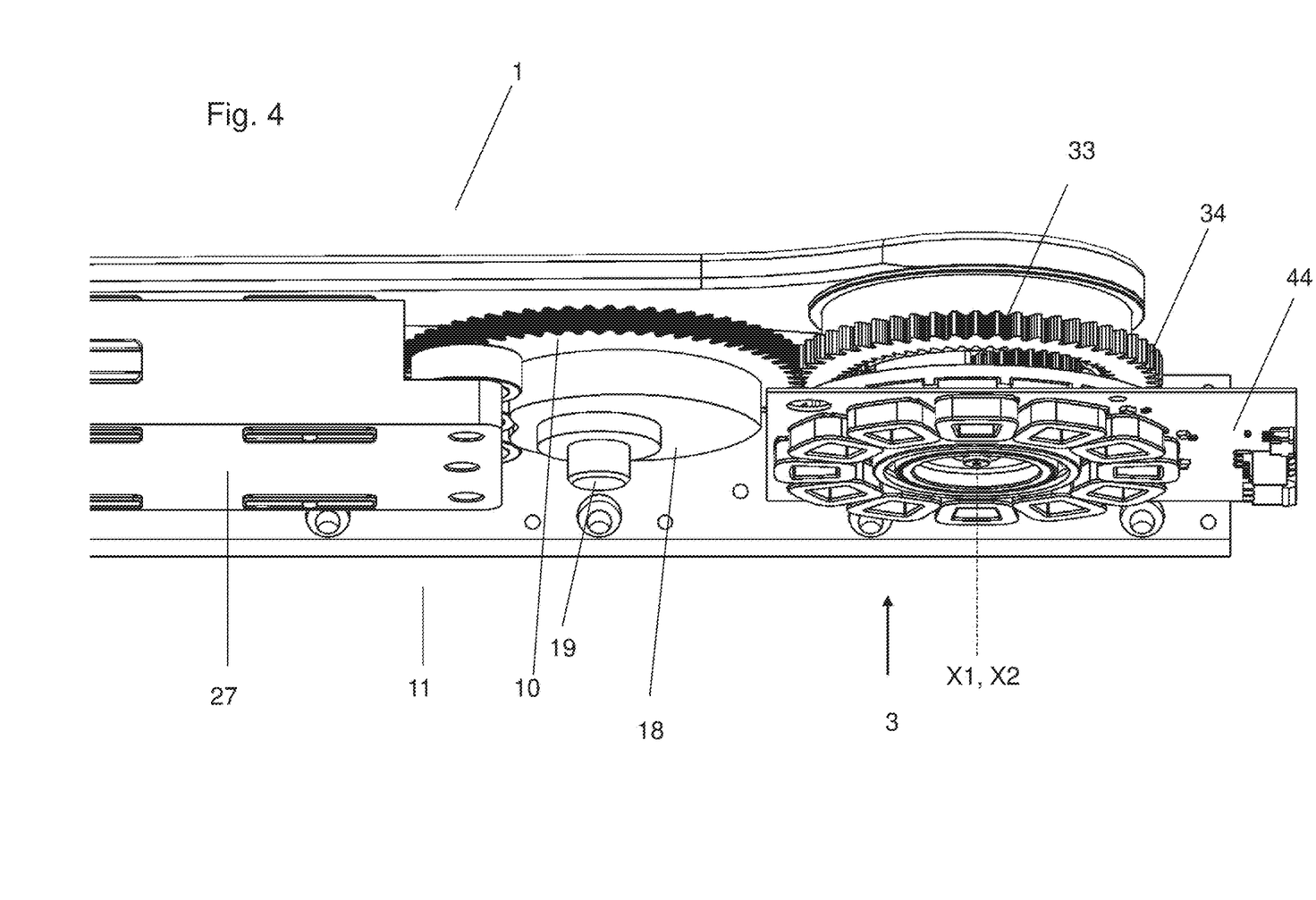
FIG. 4 a further exemplary embodiment of a drive device with a planetary gear, FIG. 5 the drive device from FIG. 4 with the ring gear removed, and FIG. 6 an axial flux machine in a basic representation in section.
Figure 5:
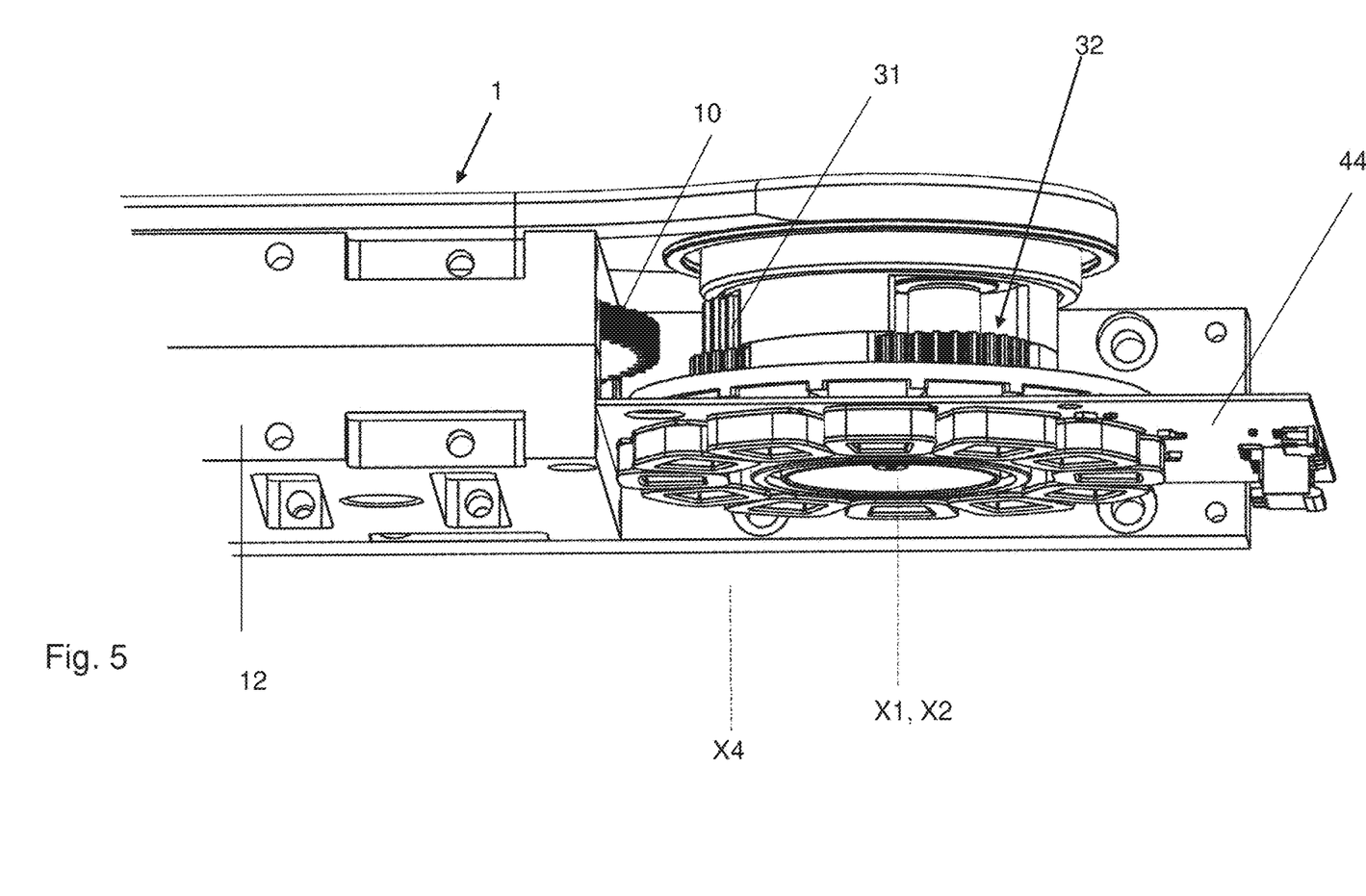

In the FIGS. 4 and 5, the drive device 1 is represented in a further configuration, with the gear 7, in contrast to the exemplary embodiment of FIGS. 1 and 2, being designed as a planetary gear. The terms planet and planetary wheel are used synonymously.

As a planetary gear, the gear 7 has a Wolfrom stage. Such a Wolfrom stage has a first gear stage and a second gear stage. The first gear stage comprises a sun gear, a plurality of first planets 32 fastened to a planetary carrier and driven by the sun gear, and a first, stationary ring gear. The sun gear and the first stationary ring gear cannot be seen in FIGS. 4 and 5 due to the view selected. The second gear stage comprises a second rotatable ring gear 33, second planets 31 which are rotationally-fixed with the first planets 32. The second planets 31 drive the second ring gear 33. The second ring gear 33 forms the power output of the planetary gear. In FIG. 5, the second ring gear is removed.

The gear 7 according to the exemplary embodiment of FIGS. 4 and 5 is designed as a combination of planetary gear and spur gear. The second ring gear 33 of the planetary gear has external teeth 34 and acts as a spur gear. The ring gear 33 is engaged with the closer wheel 10 of the closer module 11. In the exemplary embodiment of FIGS. 4 and 5, the closer wheel 10 forms the interface element.

In the exemplary embodiment of FIGS. 4 and 5, the output axis X2 is coaxial with the machine axis X1.

In the exemplary embodiments described, the electric machine 6 is designed as an axial flux machine.

Figure 6:
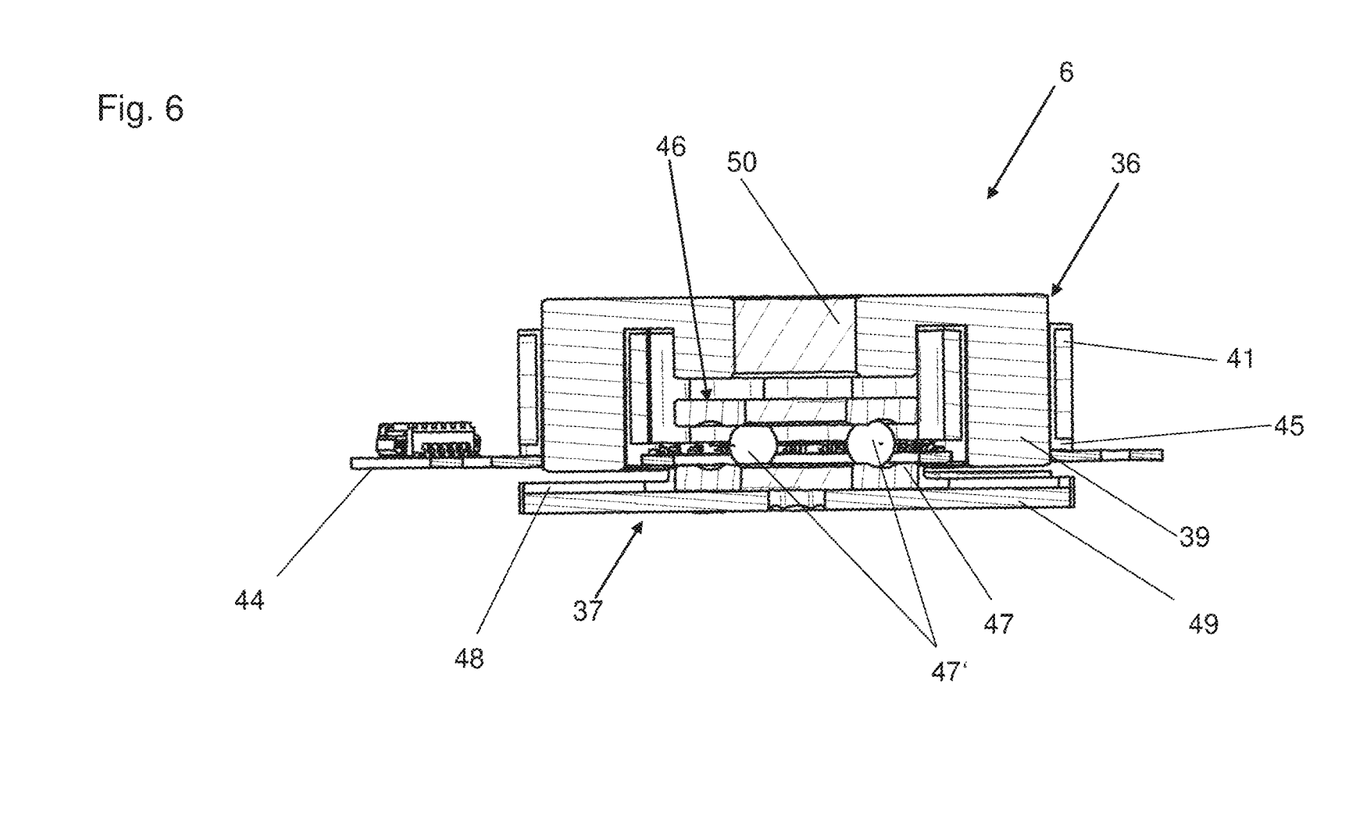

The electric machine 6 is represented in principle as a detail in FIG. 6. The electric machine 6 has a stator 36 and a rotor 37. The stator 36 has a plate-shaped stator base 38 and a plurality of stator teeth 39 protruding from the stator base 38 in the axial direction of the electric machine 6. A coil 41 is arranged around each of the stator teeth 39. Each stator tooth 39 has an electrically insulating tooth cover 45, with the stator 36 having a plurality of coils 41 and each of the coils 41 being wound around the tooth cover 45 and therefore indirectly via the tooth cover 45 around the stator tooth 39. The stator teeth 39 pass through a circuit board 44 on which the coils 41 are contacted.

It can be seen in FIG. 6 that the stator 36 also comprises a stationary bolt 50, with the bolt 50 having a bearing mount 46 for receiving a roller bearing 47. A roller bearing 47 with balls 47' is represented in FIG. 6 as an example. The drive device 1 comprises the roller bearing 47 for the rotatable bearing of the rotor 37 with respect to the stator 36, with the roller bearing 47 being received on the bearing mount 46 of the bolt 50. The rotor 37 is rotatably mounted on the stator 36 by means of the roller bearing 47. In an embodiment that is not represented, a bearing mount can be provided directly on the stator base, on which a roller bearing can be received. The rotor 37 comprises a plurality of permanent magnets 48. Each permanent magnet 48 is formed in a plate shape. The rotor 37 has a rotor plate 49 in the form of a rotor disc. Furthermore, each permanent magnet 48 protrudes from the rotor plate 49 of the rotor 37 in the axial direction of the electric machine, in particular in the direction of the stator 36.

As can be seen from FIGS. 1 and 2, the gear 7 has a first gear element 42 which can be rotated coaxially with the machine axis X1 and which is connected to the rotor 37 in a rotationally-fixed manner. The gear 7 also has a second gear element 43, which is operatively connected to the first gear element 42, with an axis of rotation X4 of the second gear element 43 running in an installation space between the machine axis X1 and an outer lateral surface of the rotor 37 that is extended virtually in the axial direction of the electric machine 6 or an outer lateral surface of the stator 36 that is extended virtually in the axial direction of the electric machine 6, in particular parallel to the machine axis X1.

In the exemplary embodiment relating to FIGS. 4 and 5, the first gear element 42 is designed as a sun gear 29 and the second gear element 43 is designed as a planetary gear 32. The sun gear 29 is connected to the rotor 37 in a rotationally-fixed manner. The axis of rotation X4 of the second gear element 43 runs in an installation space between the machine axis X1 and an outer lateral surface of the rotor 37 that is extended virtually in the axial direction of the electric machine 6 or an outer lateral surface of the stator 36 that is extended virtually in the axial direction of the electric machine 6, in particular parallel to the machine axis X1.

In addition, a circuit board 44, which is arranged in the installation space between the stator base 38 and the rotor 37, can be seen in FIGS. 2 and 4 and 5.

The invention claimed is:

1. A drive device used in a swing leaf door drive or in a sliding door drive or in a revolving door drive for moving a leaf with an electric machine comprising a single, stator and a single, rotor, configured to be rotated about a machine axis, and with a gear coupled to the electric machine, wherein the gear has a first gear element, configured to be rotated coaxially with the machine axis, wherein the first gear element is connected to the rotor in a rotationally-fixed manner,
   wherein the gear has a second gear element, which is operatively connected to the first gear element, and in that an axis of rotation of the second gear element runs in an installation space between the machine axis and an outer lateral surface of the rotor that is extended virtually in the axial direction of the electric machine or an outer lateral surface of the stator that is extended virtually in the axial direction of the electric machine, the drive device further comprising an output shaft which can be rotated about an output axis, for connection to a lever, wherein the output axis runs parallel or coaxial to the machine axis,
   and a closer module having a mechanical energy storage device, and a transmission element for translating a linear movement of the mechanical energy storage device into a rotational movement of the transmission element,
   wherein the closer module comprises a closer wheel which is operatively connected to the energy storage device, by the transmission element,
   wherein the gear has an output wheel which is coaxial and rotationally-fixed with the output shaft, with the output wheel being engaged with the closer wheel.

2. The drive device according to claim 1, wherein the first gear element and the second gear element or the entire gear is arranged entirely in one installation space, wherein the installation space is delimited by an outer lateral surface of the rotor that is extended virtually in the axial direction of the electric machine or by an outer lateral surface of the stator that is extended virtually in the axial direction of the electric machine.

3. The drive device according to claim 1, wherein a machine housing and/or a gear housing and/or a motor-gear housing, wherein the electric machine is arranged at least partially within the machine housing, wherein the gear is arranged at least partially within the motor-gear housing.

4. The drive device according to claim 1, wherein the gear is designed as a toothed gear.

5. The drive device according to claim 1, wherein the gear is designed as a planetary gear, wherein the first gear element is designed as a sun gear and at least one second gear element as a planetary gear.

6. The drive device according to claim 5, wherein the gear comprises a first ring gear, which is engaged with the planetary gear, wherein the planetary gear is mounted so as to be rotatable on a planetary carrier, wherein the planetary carrier is mounted so as to be rotatable on the sun gear or on the rotor, which is connected to the sun gear in a rotationally-fixed manner.

7. The drive device according to claim 1, wherein the transmission element is designed as a cam disc.

8. The drive device according to claim 1, wherein the closer wheel is arranged coaxially with respect to the transmission element, wherein the transmission element and the closer wheel are connected in a form-fitting and/or force-fitting and/or materially-bonded manner.

9. The drive device according to claim 1, wherein the gear has a transmission ratio as a quotient of the speed of the rotor as a dividend and the speed of the closer wheel or the speed of the transmission element of less than 125.

10. The drive device according to claim 1, wherein at least one interface element for forming an operative connection between the electric machine and the closer module, wherein the interface element comprises at least one gear wheel.

11. The drive device according to claim 1, comprising a motor-gear housing and a closer housing, wherein the electric machine and the gear are arranged at least partially within the motor-gear housing, wherein the energy storage device is arranged within the closer housing, wherein the electric machine and the energy storage device are operatively connected by means of the interface element, wherein the interface element protrudes through a first opening of the motor-gear housing into the motor-gear housing and/or through a second opening of the closer housing into the closer housing.

12. The drive device according to claim 1, wherein the electric machine is designed as an axial flux machine, wherein the stator has a plate-shaped, stator base and a plurality of stator teeth protruding from the stator base, wherein a coil is wound at least indirectly or directly around one stator tooth.

* * * * *